(12) United States Patent
Nakagawa et al.

(10) Patent No.: US 6,220,320 B1
(45) Date of Patent: *Apr. 24, 2001

(54) PNEUMATIC MOTORCYCLE TIRE

(75) Inventors: Hidemitsu Nakagawa; Takashi Sumida, both of Tokyo (JP)

(73) Assignee: Bridgestone Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/030,843

(22) Filed: Feb. 26, 1998

(30) Foreign Application Priority Data

Feb. 27, 1997 (JP) .................................................... 9-043830

(51) Int. Cl.$^7$ .......................... B60C 11/03; B60C 119/00; B60C 115/00
(52) U.S. Cl. .................................. 152/209.11; 152/209.28
(58) Field of Search ............................ 152/209.2, 209.11, 152/209.28, 904

(56) References Cited

U.S. PATENT DOCUMENTS 5,358,020 * 10/1994 Haas ................................. 152/209.11
5,421,389 * 6/1995 Favre et al. ............................ 152/904

FOREIGN PATENT DOCUMENTS

| 368553 | * | 5/1990 | (EP) . |
| 56-90702 | * | 7/1981 | (JP) ................................. 152/209.11 |
| 63-116907 | * | 5/1988 | (JP) . |
| 3-135802 | * | 6/1991 | (JP) . |
| 3-273909 | * | 12/1991 | (JP) . |
| 8-142609 | * | 6/1996 | (JP) . |
| 9-48214 | * | 2/1997 | (JP) . |

* cited by examiner

Primary Examiner—Steven D. Maki
(74) Attorney, Agent, or Firm—Sughrue, Mion, Zinn, Macpeak & Seas, PLLC

(57) ABSTRACT

A pneumatic tire for a two-wheeled vehicle having high lateral stiffness and exhibiting improved steering stability has a tread pattern defined in a tread portion by numerous sets of combination lug groove patterns. In this tread portion, one set of the left and right sides of the lug groove patterns is reverse W-shaped as a whole in the tire rolling direction, each of mid bending points P on both sides of the reverse W-shape is arranged at the region of 20–80% of a tire tread half width TW from a tire central circumferential line EC, an angle of the lug groove component to a tire shoulder portion from the mid bending point P is 20–70° with respect to a tire equatorial plane E, and an angle of the lug groove component to the tire central circumferential line EC from the bending point P is 20–70° with respect to the tire equatorial plane E.

5 Claims, 1 Drawing Sheet

PNEUMATIC MOTORCYCLE TIRE

BACKGROUND OF THE INVENTION

1. Field of the Invention

The present invention relates to a pneumatic tire for a two-wheeled vehicle, particularly relates to a pneumatic tire for a two-wheeled vehicle capable of obtaining high lateral stiffness without requiring any tire structural change, material change and the like, and of exhibiting improved steering stability.

2. Description of the Related Art

In a conventional pneumatic tire for a two-wheeled vehicle, it is general to employ a measure for improving steering stability as possible under a specified tire size, and it is also general to improve the lateral stiffness of a tire as an advantageous standard of the measure.

As an effective means for improving the lateral stiffness of a tire, hitherto, it has been mainly conducted for each kind of members for constructing a tire, i. e., carcass ply, cord layers such as belt or breaker, and the like, further bead filler effective for bead portion reinforcement and the like, to improve the material and the structure of these members, and to arrange additional reinforcing members.

The aforesaid means certainly contributes to improvement of the lateral stiffness of a tire, but simultaneously encounters a problem that the lateral stiffness improvement by the change of material and structure increases the vertical spring constant of a tire with the result that the confort against vibration is reversely affected. Moreover, the lateral stiffness improvement contingent to the addition of members is undesirable for not only an increase of the material cost but also an increase of the processing cost.

SUMMARY OF THE INVENTION

Accordingly, an object of the invention is to provide a pneumatic tire for a two-wheeled vehicle capable of obtaining high lateral stiffness without requiring any structural change, material change and the like of a tire, and of exhibiting improved steering stability.

It has been well-known that an increase of the ground-contact area of a load rolling tire at the tread surface as possible is effective for the lateral stiffness improvement of a tire for a two-wheeled vehicle. As one technique for increasing the ground-contact area, it is effective to decrease the flexural stiffness of a tread portion, but this technique tends to deteriorate the shearing stiffness of the tread portion within the ground-contact area, further has a tendency to lower the flexural stiffness at a non-ground-contact area, and both these tendencies are disadvantageous to steering stability. The present inventors have therefore energetically studied by aiming at a tread pattern for increasing the ground-contact area without such disadvantage, and as a result, solved the above problem by forming a predetermined reverse W-shaped pattern in a tread portion, and accomplished the present invention.

According to the invention, there is the provision of a pneumatic tire for a two-wheeled vehicle formed with numerous sets of combination lug groove patterns on the tread surface of a tread portion, wherein one set of the left and right sides of the lug groove patterns is reverse W-shaped as a whole in the tire rolling direction, each of mid bending points P on both sides of the reverse W-shape is arranged at the region of 20–80% of a tire tread half width TW from a tire central circumferential line EC, an angle $\alpha$ of the lug groove component to a tire shoulder portion from the mid bending point P is 20–70° with respect to a tire equatorial plane E, and an angle $\beta$ of the lug groove component to the tire central circumferential line EC from the bending point P is 20–70° with respect to the tire equatorial plane E.

The pneumatic tire for a two-wheeled vehicle according to the invention preferably forms at least one circumferential groove in a tread central region and arranges the circumferential groove in the region from the tire central circumferential line EC to 35% of the tire tread half width TW. Moreover, a pitch DP of the lug groove is preferably $\frac{1}{100}$–$\frac{1}{20}$ of the entire circumferential length, and furthermore, an offset amount OF for offsetting left and right patterns by symmetrizing the central circumferential line EC is preferably 0–$\frac{1}{20}$ of the whole circumferential length. Here, the central circumferential line EC means a crossing line between the tire equatorial plane E and the tread surface.

BRIEF DESCRIPTION OF THE DRAWINGS

The invention will be described with reference to the accompanying drawings, wherein.

DESCRIPTION OF THE PREFERRED EMBODIMENTS

Figure 1:
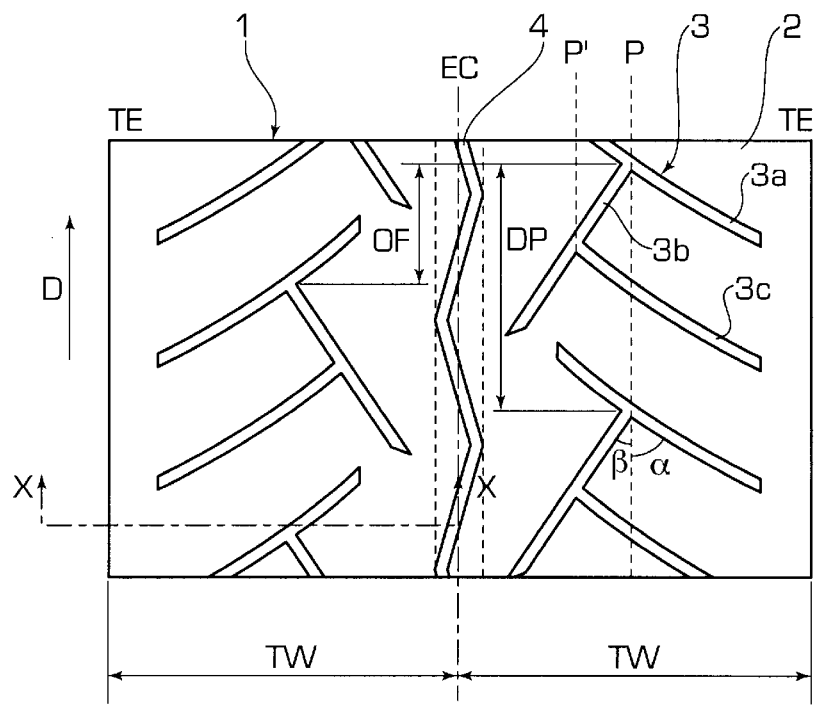
FIG. 1 is a developed plan view of tread patterns of a pneumatic tire for a two-wheeled vehicle according to the invention.
Figure 2:
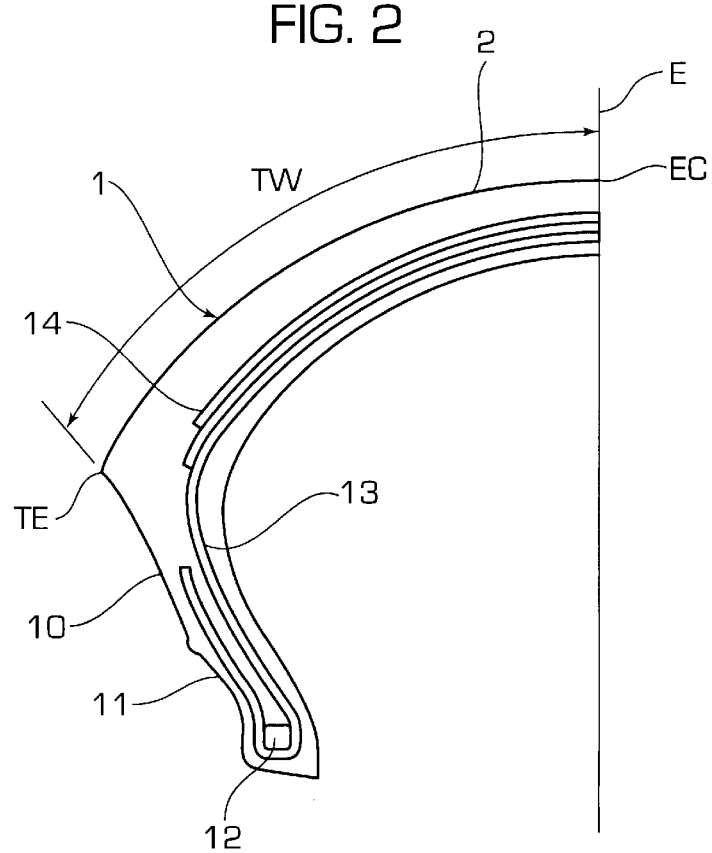
FIG. 2 is a left half cross section of the pneumatic tire for a two-wheeled vehicle according to the invention.

FIG. 1 is a drawing partly developing a tread surface 2 in a tread portion 1 of a pneumatic tire for a two-wheeled vehicle according to the invention, and the developed view should essentially show the tread surface 2 tapered from the center to both sides, but shows the whole of the tread surface 2 with the same length as that of the central circumferential length for convenience. Moreover, FIG. 2 is a cross section of the tire along the line X—X of FIG. 1, and the tire tread half width TW of the tread surface 2 shown in FIG. 1 means an arc length along the tread surface 2 from a central circumferential line EC to a tread surface 2 edge TE as shown in FIG. 2.

In the pneumatic tire for a two-wheeled vehicle as a preferred embodiment of the invention shown in FIG. 1, numerous sets of combination lug groove patterns 3 are formed on the tread surface 2 of the tread portion 1. One set of the left and the right of such lug groove patterns is reverse W-shaped in the tire rolling direction shown in FIG. 1 as a whole. Incidentally, FIG. 1 shows a developed plane view of the tire under such a condition that it is fit to a two-wheeled vehicle looking down from above, and the direction D indicates the tire rolling direction. Each of the mid bending points P on the reverse W-shaped left and right should be arranged within a region of 20–80%, preferably 35–65% of the tire tread half width TW from the central circumferential line EC. When this arrangement region is less than 20%, the cornering stability deteriorates due to tread surface stiffness excess of the shoulder portion against the central portion, while if the region exceeds 80%, the straight running stability deteriorates due to tread surface stiffness excess of the central portion against the shoulder portion.

Moreover, an angle a of the lug groove component from the above mid bending point P to the tire shoulder portion is 20–70, preferably 40–60° with respect to the tire equatorial plane E, and an angle $\beta$ of the lug groove component from the mid bending point P to the tire central circumferential line is 20–70°, preferably 25–45° with respect to the tire equatorial plane E. The angle α is also preferably greater than the angle β. When these angles are less than 20°, the drainability during cornering deteriorates. If the angles exceed 70°, the drainability during straight running deteriorates.

The lug groove according to the invention may preferably be continued as the reverse W-shape so far as the above conditions are satisfied, or intermittently in the vicinity of the central circumferential line EC as illustrated. Moreover, in the lug groove pattern 3 shown in FIG. 1, a mid bending point P is formed with a lug groove 3a and a lug groove 3b. An auxiliary lug groove 3c is not necessarily required, but it can be considered that a mid bending point P' is formed with the lug groove 3c and the lug groove 3b when lug groove 3c is added to the tread pattern. A pitch DP of the lug groove pattern 3 is preferably 1/100–1/20 of the entire circumferential length for obtaining effects of the invention. Moreover, in order to improve comfort against vibration, the offset amount OF for offsetting (phase shifting) left and right patterns by symmetrizing the central circumferential line EC is preferably 0–1/20 of the whole circumferential length. A width size of the lug groove is preferably 1/25–1/1 of the pitch DP.

The pneumatic tire for a two-wheeled vehicle according to the invention is preferably formed with at least one circumferential groove 4 in a tread center zone, and the circumferential groove is arranged within the region of 35% of the tire tread half width TW from the tire central circumference EC. The provision of such circumferential groove lowers the stiffness of the ground-contact region and further contributes to further improvement of the lateral stiffness based on ground-contact area improvement. The circumferential groove may be a zigzag groove or a straight groove, at least one of which is arranged and further may be continuous or intermittent.

Furthermore, the pneumatic tire for a two-wheeled vehicle according to the invention provided with the aforesaid tread patterns, as shown in FIG. 2, has a pair of sidewall portions 10 (only one is shown) lined with a tread portion and a pair of bead portions 11 (only one is shown), and is provided with a carcass 13 for reinforcing each of the above portions extended between bead cores 12 embedded in the bead portions 11. The carcass 13 may be either radial ply or bias ply, in case of the radial ply, a belt 14 is provided around the circumference of the carcass 13, and in case of the bias ply, a breaker 14 is provided around the circumference of the carcass 13 or can be omitted as constructed as in the prior art. In case of the belt 7, it is preferable that the belt is at least one ply of textile cord.

This invention will be further described with referance to the following Example and Comparative Example.

As Example and Comparative Example, there were manufactured bias ply tires (size 110/70R17) for a two-wheeled vehicle (motorcycle) comprising a carcass having 2 ply construction of 6, 6-nylon cords of 1260D/2 and a breaker consisting of two complex layers of 1260D/2 nylon fiber cord.

In the manufactured tire of Example, as shown in FIG. 1, numerous sets of combination lug groove patterns 3 were formed on the tread surface 2 of the tread portion 1, and one set on the left and the right of such lug groove patterns was reverse W-shaped as a whole in the tire rolling direction. Each of mid bending points P on both sides of the reverse W-shape was arranged within the region of almost 50% of the tire tread half width TW. Moreover, the angle α of the groove component to the tire shoulder portion from the mid bending point P was 50° with respect to the tire equatorial plane E, and the angle β of the lug groove component to the tire central circumferential line EC from the mid bending point P was 35° with respect to the tire equatorial plane E. Moreover, the pitch DP of the lug groove pattern 3 was 1/40 of the whole circumferential length, and the offset amount OF was 1/80 of the entire circumferential length. In the tread central zone was continuously formed one circumferential zigzag groove within the region of 10% of the tire tread half width TW from the tire central circumferential line EC.

On the other hand, in the manufactured tire of Comparative Example, the reverse W-shaped pattern used in the above Example was reversed in the tire rolling direction, namely, W-shaped pattern in the tire rolling condition.

On the tires of Example and Comparative Example, camber thrust (CTH) to each camber (CA) angle were evaluated. Test conditions are as follows.

To the tire to be tested was applied load 110 kgf in the camber (CA) direction, the tire was run by pressing to a drum tester, the camber angle was changed from 0° to 45°, and camber thrust (CTH) generated in the tire were measured. The evaluation was indicated with an index on the basis of the tire of Comparative Example as 100. The larger the numerical values, the better the results. The obtained results are shown in the following Table 1.

TABLE 1

|  | CA (°) | | | | |
|---|---|---|---|---|---|
| CTH (index) | 10 | 20 | 30 | 40 | 45 |
| Comparative Example | 100 | 100 | 100 | 100 | 100 |
| Example | 102 | 105 | 106 | 105 | 103 |

As explained above, in the pneumatic tire for a two-wheeled vehicle according to the invention, high lateral stiffness is obtained without requiring any tire structural change, material change and the like by forming a predetermined reverse W-shaped pattern on a tread, and excellent steering stability is exhibited.

What is claimed is:

1. A pneumatic motorcycle tire comprising; a zigzag circumferential groove, numerous sets of lug groove patterns, each set of lug groove patterns including a left lug groove pattern on one side of said zig zag circumferential groove and a right lug groove pattern on the other side of zig zag circumferential groove, one set of the left and right lug groove patterns being a reverse W-shape as a whole in a tire rolling directs, each of the left and right lug groove patterns of the reverse W-shape having a mid bending point which is arranged in a region of 35–65% of a tire half width TW from a tire central circumferential line, a first lug groove component extending from the mid bending point to a tire shoulder portion, a second lug groove component extending from the mid bending point to the tire central circumferential line, and a third lug groove component extending from said second lug groove component to the tire shoulder portion, an angle α of the first lug groove component extending from the mid bending point to the tire shoulder portion being 20–70° with respect to the tire equatorial plane and an angle β of the second lug groove component extending from the mid bending point to the tire central circumferential line being 20–70° with respect to the tire equatorial plane wherein, the left lug groove pattern and the right lug groove pattern of the one set are offset in the circumferential direction.

2. A pneumatic motorcycle tire according to claim 1, wherein said angle α is 40–60° and said angle β is 25–45°, and the angle α is greater than the angle β.

3. A pneumatic motorycle tire according to claim 1, wherein said zig-zag circumferential groove is arranged in a region from the tire central circumferential line to 35% of the tire tread half width.

4. A pneumatic motorcycle tire according to claim 1, wherein a pitch of said lug groove patterns is $\frac{1}{100}$–$\frac{1}{20}$ of the circumferential length of said tire.

5. A pneumatic motorcycle tire according to claim 1, wherein the left lug groove pattern and the right lug groove pattern are offset in the circumferential direction by an offset amount, wherein said offset amount is more than 0 times the circumferential length of the tire and less than $\frac{1}{20}$ of the circumferential length of the tire.

* * * * *